United States Patent [19]
Kawaguchi

[11] 3,989,261
[45] Nov. 2, 1976

[54] MOTORCYCLE FRONT-WHEEL SUSPENSION WITH MEANS FOR RESTRAINT OF COMPRESSION OF A TELESCOPIC FRONT UPON BRAKING

[75] Inventor: Takeshi Kawaguchi, Fujimi, Japan

[73] Assignee: Honda Giken Kogyo Kabushiki Kaisha, Tokyo, Japan

[22] Filed: July 24, 1975

[21] Appl. No.: 598,986

[52] U.S. Cl. .............................. 280/276; 188/272
[51] Int. Cl.² .......................................... B62K 25/08
[58] Field of Search ............... 280/276, 277, 124 F; 188/272, 300

[56] References Cited
UNITED STATES PATENTS

| | | | |
|---|---|---|---|
| 1,994,504 | 3/1935 | Cox | 188/300 X |
| 2,918,306 | 12/1959 | Lewandoski | 280/124 F |
| 3,199,892 | 8/1965 | Boys | 188/300 X |

FOREIGN PATENTS OR APPLICATIONS

| | | | |
|---|---|---|---|
| 546,631 | 3/1932 | Germany | 280/276 |
| 717,259 | 10/1954 | United Kingdom | 280/276 |

*Primary Examiner*—Kenneth H. Betts
*Attorney, Agent, or Firm*—Haseltine, Lake & Waters

[57] ABSTRACT

A brake on the front wheel of a motorcycle is associated with a member which is arranged for angular displacement relative to a front fork upon application of the brake. Torque exerted on this member upon braking is utilized, as through a leverage mechanism, to lock the pair of telescopic shock absorbers of the front fork against compression which may be caused by inertia at that instant. In another embodiment of the invention the angular displacement of the member results in the closure of a shutoff valve arranged between hydraulic fluid chambers within one of the shock absorbers. The front wheel brake can be either an internal-expanding shoe brake or a caliper-type disc brake.

13 Claims, 7 Drawing Figures

FIG. 2
FIG. 3
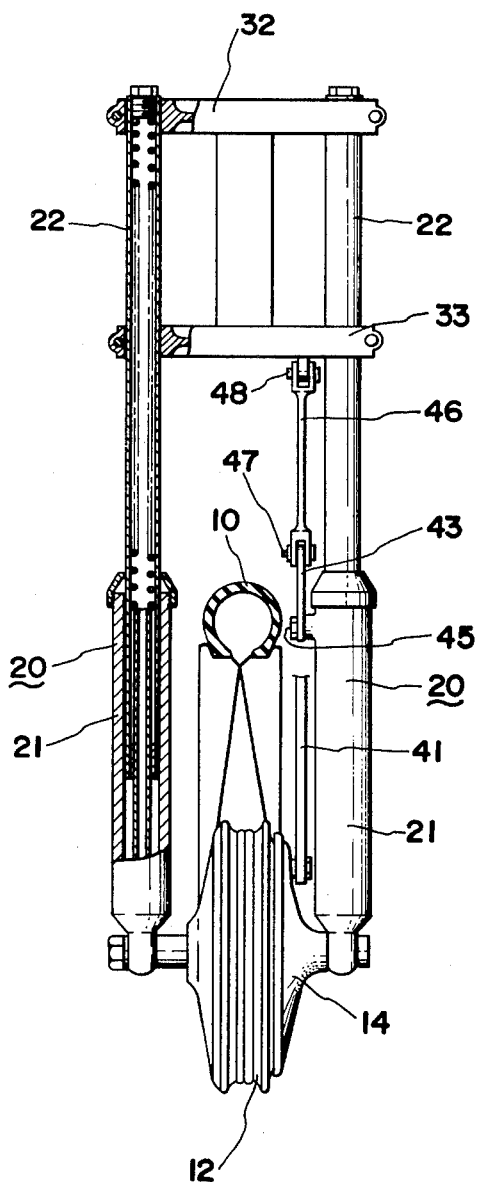
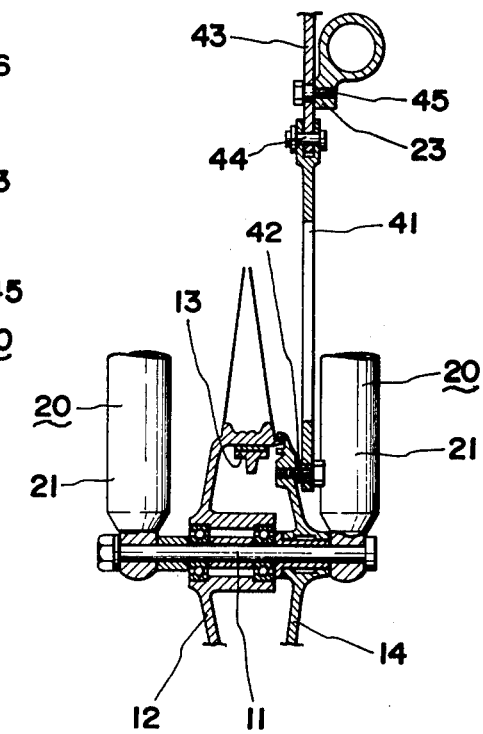

MOTORCYCLE FRONT-WHEEL SUSPENSION WITH MEANS FOR RESTRAINT OF COMPRESSION OF A TELESCOPIC FRONT UPON BRAKING

FIELD OF THE INVENTION

This invention relates to front-wheel suspensions for motorcycles, and in particular to a motorcycle front-wheel suspension including a pair of telescopic shock absorbers in the front fork. Even more particularly, the invention deals with means for restraint of the telescopic shock absorbers from unnecessary compression taking place when the motorcycle is braked.

BACKGROUND

As is well known, the front-end springing of motorcycles now usually takes the form of a telescopic front fork, such that each prong of the fork comprises a fork pipe and bottom case, one nesting in the other. The fork pipe and bottom case may contain both compression springs and oil and work telescopically to absorb the jolts caused by the irregularities of the road surface or other obstacles encountered. When the motorcycle incorporating this type of front-wheel suspension is braked, the fork pipes of the front fork inevitably slide down into the bottom cases by inertia. The front fork thus undergoes compression, almost to the fullest extent possible when the vehicle is braked abruptly.

Such compression of the telescopic front fork upon braking is not only unnecessary but hazardous, because the compressed fork is capable of absorbing significantly less energy of shock than usual. Thus, should the front wheel receive a jolt from some obstacle on the road surface during or immediately after abrupt braking, the front fork will transmit nearly the full impact of the jolt to the handlebars and frame of the motorcycle. The driver may then become unable to make proper steering and control of his machine.

SUMMARY OF THE INVENTION

It is an object of this invention to provide a motorcycle front-wheel suspension which includes means for restraining the unnecessary compression of the front fork upon braking, thereby affording steering stability and ease.

Another object of the invention is to provide a motorcycle front-wheel suspension so made that, while the front fork is locked against unnecessary compression upon braking, it will nevertheless undergo compression to perform the usual shock-absorbing function if the front wheel receives a jolt during or immediately after the braking operation.

A further object of the invention is to provide a motorcycle front-wheel suspension wherein the restraint of the front fork from the unnecessary compression is realized by use of simple and compact means, so installed as to cause no inconvenient increase in the dimensions of the usual front-end suspension.

A further object of the invention is to provide a motorcycle front-wheel suspension wherein the braking of the front wheel is detected, by means directly associated with the front wheel brake, to check the resultant compression of the front fork, so that the operation of the system is positive and reliable.

It is also an object of this invention to provide a motorcycle front-wheel suspension wherein the means for restraint of front fork compression is easily modifiable so that the front fork will undergo some slight compression upon braking, instead of being held fully extended.

With these and other objects in view this invention provides, in a front-wheel suspension for a motorcycle which includes a front fork having a pair of telescopic shock absorbers, the combination including braking detector means for detecting the application of a brake on the front wheel. The braking detector means includes a member which is arranged for angular displacement relative to the front fork upon application of the front wheel brake. Locking means is actuated by the braking detector member to restrain the telescopic shock absorbers from unnecessary compression upon braking.

The braking detector member can take a variety of practical forms depending upon the type of the front wheel brake in use. In the case of an internal-expanding shoe-type brake, for example, the braking detector member can be in the form of a disc-like brake panel which supports the shoes and which is mounted on the front wheel axle so as to be rotatable independently of the front wheel. Upon expansion of the brake shoes into frictional contact with the usual brake drum, therefore, the brake panel will be urged to rotate in the same direction as the front wheel until the shoes completely arrest the front wheel rotation.

In the case of a partial disc brake the braking detector member takes the form of a caliper holder holding thereon the so-called caliper which grips the brake disc pincer-wise. The caliper holder is pivotally mounted on the front fork so as to make some angular displacement relative to the latter upon application of the brake.

According to a preferred embodiment of this invention the locking means includes a leverage mechanism connecting the braking detector member, in the form of the brake panel, to a bridge or transverse link between the fork pipes of the telescopic shock absorbers in the front fork. Thus, upon application of the front wheel brake, the leverage mechanism exerts an upward force on the fork pipes thereby preventing the same from nesting in the respective bottom cases against the force applied downwardly to the fork pipes by inertia. In event the front wheel receives a jolt at that instant, the equilibrium of the forces that has been restraining the compression of the front fork will be canceled to permit the fork to undergo compression and hence to lessen the shock.

In another preferred embodiment of the invention the locking means includes a shutoff valve provided to a predetermined path through which there flows a hydraulic fluid in one of the telescopic shock absorbers to permit the same to perform the shock-absorbing function. Upon braking the valve shuts off the flow of the hydraulic fluid to check compression of the front fork. This shutoff valve can be actuated either by the brake panel of the internal-expanding shoe-type brake, preferably in combination with a leverage mechanism, or by the caliper holder of the disc brake. A jolt applied to the front wheel at that instant can likewise be absorbed by the front fork because then the shutoff valve is compulsorily opened by the increased pressure of the hydraulic fluid.

The features which are believed to be novel and characteristic of this invention are set forth in particular in the appended claims. The invention itself, however, both as to its organization and mode of operation, together with the additional objects and advantages thereof, will become apparent in the course of the following description which is to be read in connection with the accompanying drawings in which like reference characters refer to like parts throughout.

BRIEF DESCRIPTION OF THE DRAWINGS

FIG. 2 is a partial end elevational view, partly in section and partly broken away, of the front-wheel suspension shown in FIG. 1;

FIG. 3 is a fragmentary view somewhat similar to FIG. 2 but including a sectional representation of a front wheel brake, braking detector member, and other related parts;

DESCRIPTION OF THE PREFERRED EMBODIMENTS

Figure 1:
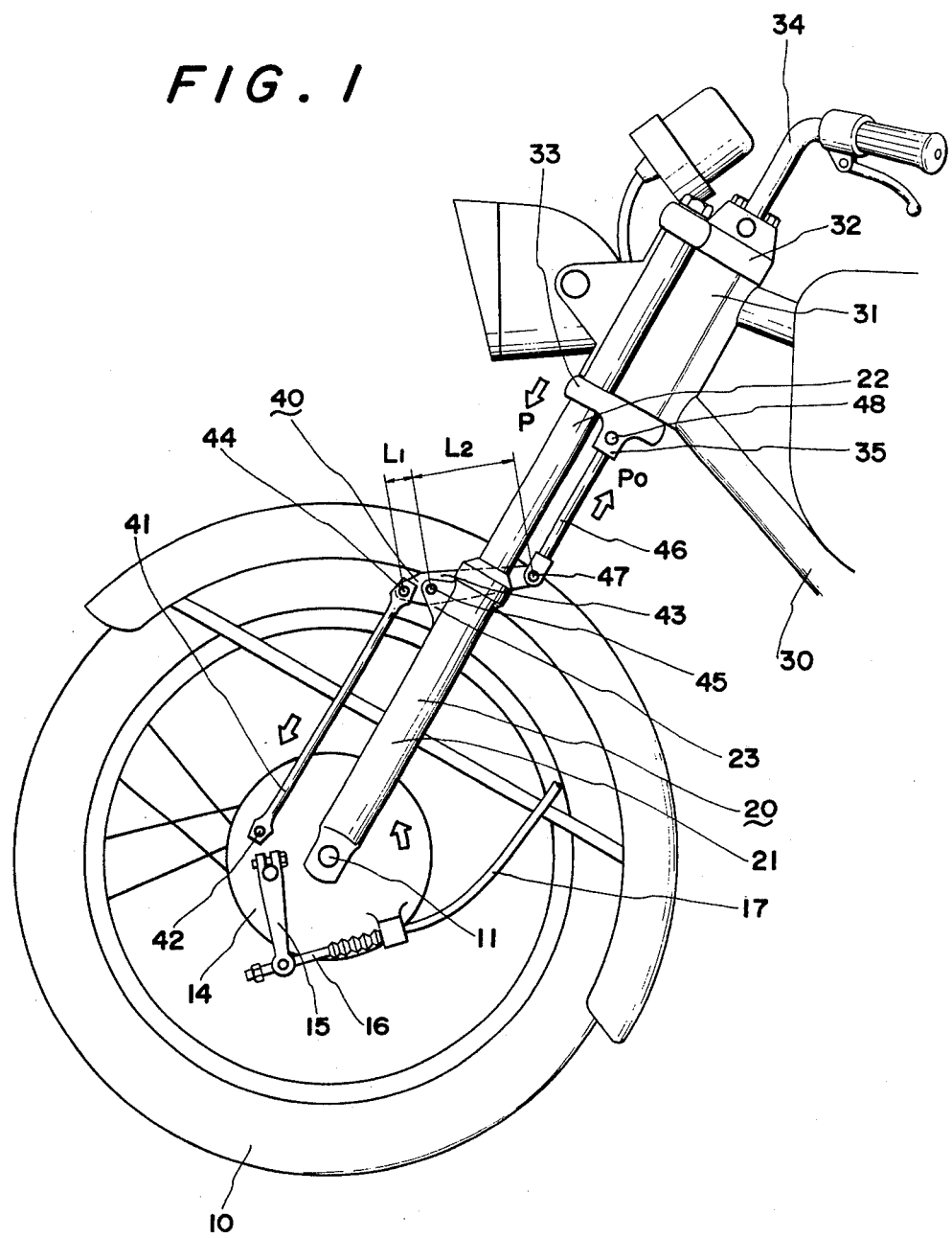
FIG. 1 is a side elevational view of the front portion of a motorcycle which includes a front-wheel suspension incorporating the novel concepts of this invention.

The invention will be first described with reference to FIGS. 1, 2 and 3 as adapted specifically for use on and in conjunction with a motorcycle in which the front wheel is sprung by helical compression springs in the front fork and is braked by an internal-expanding shoe-type brake. The front wheel 10 of the illustrated motorcycle is mounted on an axle 11 via a hub 12, FIGS. 2 and 3, that is rotatable relative to the front wheel axle. This hub doubles as the brake drum of the internal-expanding brake, cooperating with shoes 13 that are supported on a disc-like brake panel 14 also rotatably mounted on the front wheel axle 11. This brake panel functions as the braking detector member, as hereinafter explained.

The means for causing expansion of the brake shoes 13 into frictional contact with the hub or brake drum 12 can be conventional. In this particular embodiment of the invention the brake shoes are shown to be connected via brake arm 15, rod 16 and wire 17 to the usual brake lever on the handlebars 34 of the motorcycle. Thus, upon actuation of this brake lever, the brake shoes 13 will frictionally engage the brake drum to arrest or retard the rotation of the front wheel in the well known manner. The torque imparted to the brake panel 14 at this juncture is utilized to prevent the unnecessary compression of the telescopic front fork 20 upon braking.

The front fork 20 has a pair of parallel spaced prongs each in the form of a telescopic shock absorber comprising a bottom case 21 and fork pipe 22, with the fork pipe nesting in the bottom case. The bottom cases 21 of the front fork are rigidly connected at their lower ends to the front wheel axle 11, whereas the fork pipes 22 are rigidly connected to the steering head 31 of the usual motorcycle frame 30 via top and bottom bridges 32 and 33. The front fork 20 is thus arranged astride the front wheel 10 to provide the front-end suspension of the motorcycle. Each fork pipe 22 accommodates a helical compression spring as shown in FIG. 2.

In order to lock the fork pipes 22 of the front fork 20 against sliding motion down into the bottom cases 21 at the time of braking there is provided a leverage mechanism, generally labeled 40 in FIG. 1, between the brake panel 14 and bottom bridge 33. The leverage mechanism 40 comprises a link 41, lever 43 and another link 46. The link 41 has one of its ends pivotally connected by a headed pin 42 to the brake panel 14 at its eccentric point such that the brake panel will exert a downward force on this link upon application of the front wheel brake. The link 41 is pivotally jointed at the other end to one end of the lever 43 via a knuckle pin 44, which lever in turn is pivotally jointed at the other end to one end of the link 46 via a knuckle pin 47. The lever 43, moreover, is pivotally pinned at 45, which is intermediate both ends thereof, to a lug 23 integral with one of the bottom cases 21 of the front fork 20. The link 46 has its other end pivotally connected via a knuckle pin 48 to a lug 35 on the bottom bridge 33 rigidly connecting the fork pipes 22 of the front fork to the steering head 31.

In operation the brake shoes 13 expand in the conventional manner into frictional contact with the brake drum 12 upon actuation of the brake lever during forward travel of the motorcycle. Since the brake shoes are supported by the brake panel 14, the latter tends to undergo angular displacement in the counterclockwise direction, as shown by the arrow in FIG. 1, upon braking. The brake panel 14 thus applies a downward force to the link 41, also as indicated by an arrow in FIG. 1, thereby causing the lever 43 to tend to swing counterclockwise about the pivot pin 45. By the leverage thus caused by the lever 43 the other link 46 exerts an upward force on the bottom bridge 33 in opposition to the force tending to depress the fork pipes 22 of the front fork into the bottom cases 21. In this manner the telescopic front fork of the motorcycle is locked against unnecessary compression at the time of braking.

For successful restraint of the compression of the front fork 20 it is necessary that the upward force P$o$ exerted on the bottom bridge 33 via the leverage mechanism 40 counter-balance the downward force P tending to depress the fork pipes 22 into the bottom cases 21. To this end the ratio of L1 to L2 of the lever 43, FIG. 1, should be so determined as to achieve equilibrium between the forces P and P$o$, which forces are in proportion to each other. It will be evident that the distance L1 represents the lever arm of the applied force, and the distance L2 the lever arm of the load.

Assume that when the front wheel 10 is thus braked, with the consequent equilibrium between the forces P and P$o$, the motorcycle encounters some obstacle on the road with the result that the front wheel is thereby thrusted upwardly. This jolt will cancel the equilibrium between the forces P and P$o$, so that the fork pipes 22 of the front fork will become properly nested in the bottom cases 21 to minimize the shock transmitted to the motorcycle frame 30.

Thus, in this first embodiment of the invention, the torque imparted to the brake panel 14 upon braking of the front wheel 10 is utilized to positively check the unnecessary compression of the telescopic front fork 20 via the leverage mechanism 40 of simplified construction. It should be appreciated that as best shown in FIG. 2, the leverage mechanism is unobtrusively arranged between the front wheel and one of the telescopic shock absorbers of the front fork.

Figure 4:
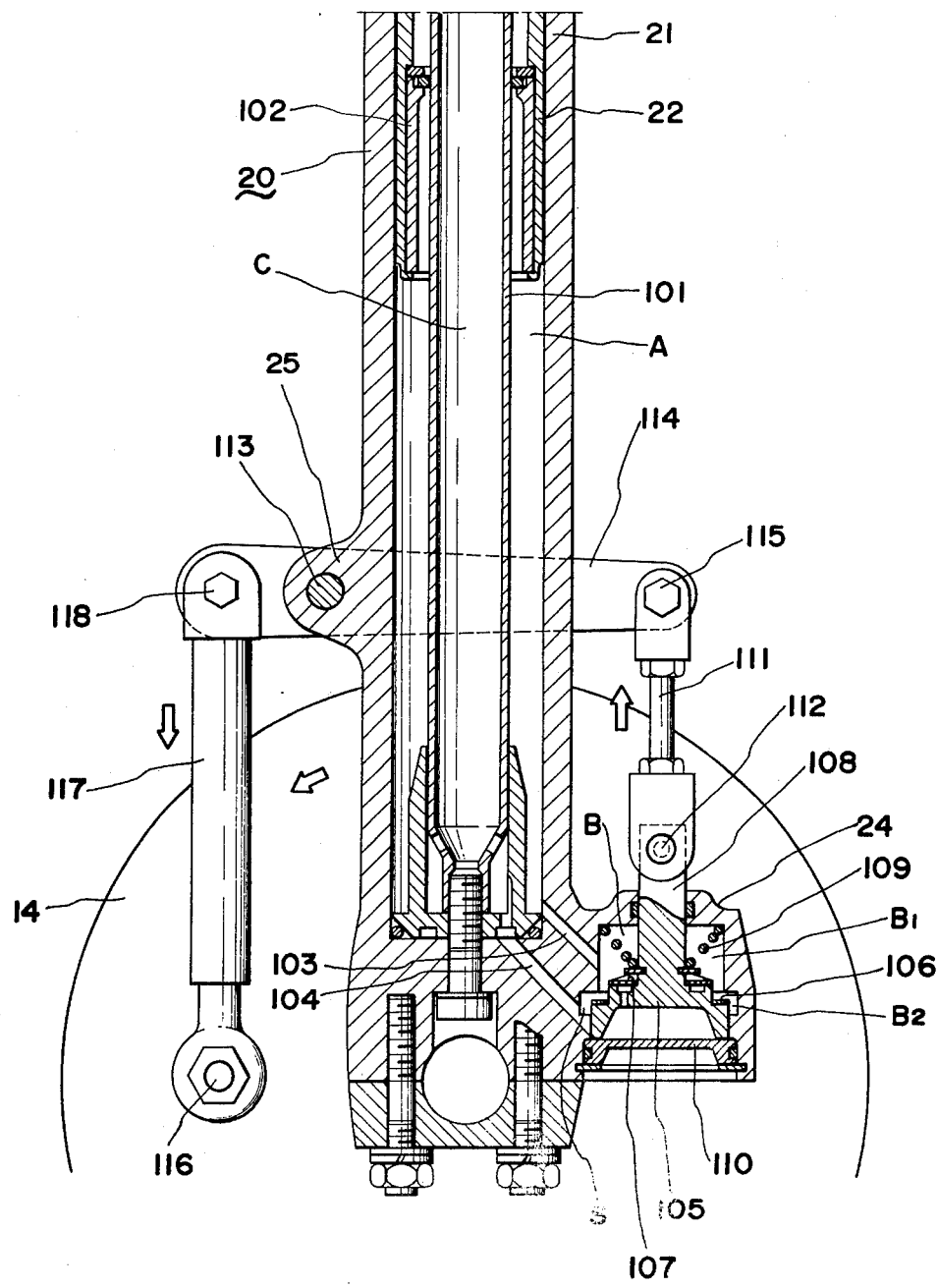
FIG. 4 is a fragmentary axial sectional view, partly in side elevation, of another preferred embodiment of the invention.

In FIG. 4 the invention is shown adapted for use on a motorcycle incorporating hydraulic shock absorbers in the front fork and, as in the preceding embodiment, the internal-expanding shoe-type brake on the front wheel. The drawing illustrates only one of the prongs of the front fork 20, it being understood that the other prong is of identical construction. The illustrated front fork prong comprises the bottom case 21 and fork pipe 22 in telescoping relationship, and an inner tube 101 is arranged coaxially within the bottom case.

Although not shown in the drawing, the usual helical compression spring is installed between the fork pipe 22 and inner tube 101. This spring is designed to cooperate with the hydraulic fluid, such as oil, within the prong to provide the necessary shock-absorbing function and, in addition, to serve as the return spring as well.

The fork pipe 22 terminates at its bottom end in a piston 102 which is slidably but pressure-tightly fitted over the inner bottom tube 101. A first hydraulic fluid chamber A of annular cross section is defined between the outer bottom case 21 and inner bottom tube 101. This first fluid chamber communicates via a passageway 103 of suitably small cross sectional area with a valve chamber B within a valve housing 24 jutting out from the lower end of the outer bottom case 21. A second fluid chamber C within the inner bottom tube 101 also communicates with the valve chamber B via a passageway 104 similar to the first mentioned passageway 103. Normally, therefore, the valve chamber B intercommunicates the first and second fluid chambers A and C via the passageways 103 and 104.

The valve chamber B is of stepped configuration to provide a smaller diameter portion B1 at the top and a larger diameter portion B2 at the bottom. The smaller diameter portion B1 of the valve chamber is in open communication with the passageway 103, and the larger diameter portion B2 with the passageway 104.

Accommodated within the valve housing 24 is a normally open, spring-returned shutoff valve which also serves as a throttle valve during the normal operation of the telescopic shock absorber. This valve includes a valve member 105 which has a shoulder 106 for contact with the valve seat provided by the step on the inside surface of the valve housing 24. The valve member 105 has a check valve 107 which permits only the return flow therethrough of the hydraulic fluid from the second chamber C to the first chamber A. The valve member 105 is integral with a stem 108 which slidably but pressure-tightly extends through the top of the valve housing 24. A compression spring 109 is installed between the valve housing 24 and valve member 105 to bias the latter downwardly against the bottom 110 of the valve housing. The passageways 103 and 104, and therefore the first and second fluid chambers A and C, are thus normally held communicated with each other via the spacing S between the valve member shoulder 106 and the opposed valve seat on the valve housing 24.

Upon compression of the telescopic front fork 20 due, for example, to the jolt of the motorcycle, the hydraulic fluid will flow from the first chamber A into the second chamber C via the passageway 103, valve chamber B and passageway 104, thereby permitting the front fork to lessen the shock of the jolt.

As in the preceding embodiment of the invention a leverage mechanism is employed to transmit the torque or angular motion of the brake panel 14 to the valve stem 108 and hence to actuate the valve member 105 to a closed position. The leverage mechanism comprises a link 111, lever 114 and link 117. The link 111 is jointed at its bottom end to the top end of the valve stem 108 via a knuckle pin 112, and at its top end to one end of the lever 114 via a knuckle pin 115. The other end of the lever 114 is jointed to the top end of the link 117 via a knuckle pin 118, while the bottom end of the link 117 is pivotally pinned at 116 to the brake panel 14 at its eccentric point. The lever 114 is pivotable about a pin 113 mounted on a lug 25 integral with the outer bottom case 21 of the front fork 20. The pivot pin 113, of course, is coupled to the lever 114 at a point suitably selected intermediate both ends thereof, as will be understood from the foregoing description of FIG. 1.

It is understood that the internal-expanding shoe-type brake on the front wheel of this motorcycle is of exactly the same configuration as that of the preceding embodiment, which is best illustrated in FIG. 3. Upon application of the front wheel brake, therefore, the brake panel 14 will receive torque, and actually undergo some angular displacement, in the counterclockwise direction as indicated by the arrow in FIG. 4.

In the operation of this second embodiment the counterclockwise rotation of the brake panel 14 upon braking of the front wheel causes the link 117 to move downwardly. By the leverage caused by the lever 114 the other link 111 is caused to move upwardly thereby pulling up the valve member 105 via the stem 108 against the bias of the compression spring 109 and the pressure of the hydraulic fluid from the first chamber A. Thereupon the shoulder 106 on the valve member 105 moves into contact with the valve seat between the portions B1 and B2 of the valve chamber B. With the first fluid chamber A thus discommunicated from the second chamber C, the fork pipe 22 of the front fork is restrained from nesting in the bottom case 21.

In the event a jolt is applied upwardly to the front wheel when the same is braked as above stated, the bottom cases 21 of the front fork will directly receive the upward thrust because they are rigidly mounted on the front wheel axle as in the preceding embodiment. This increases the pressure applied to the valve member 105 from the hydraulic fluid in the first chamber A, to such an extent that the valve will be compulsorily opened to communicate the first chamber with the second chamber C. The fork pipes 22 of the front fork will then become properly nested in the bottom cases 21 to absorb the shock. It is therefore necessary that the upward force to be exerted on the valve stem 108 via the leverage mechanism upon braking of the front wheel be suitably determined in relation to the forces tending to hold the valve member 105 in the illustrated open position.

The motorcycle may be braked while the front fork 20 is performing the shock-absorbing function. Even though the valve member 105 may then shut off the passageways 103 and 104 from each other, the check valve 107 functions to permit the return flow therethrough of the hydraulic fluid from the chamber C to the chamber A. The fork pipes 22 of the front fork are therefore free to extend away from within the bottom cases 21.

It is noteworthy in connection with this second embodiment that the invention succeeds in locking the front fork against unnecessary compression at the time of braking without impairment of the function of the front fork as the hydraulic shock absorbers. This objective, moreover, is realized merely by adding the linkage and valve mechanisms of compact construction to the motorcycle front-end suspension.

Figure 5:
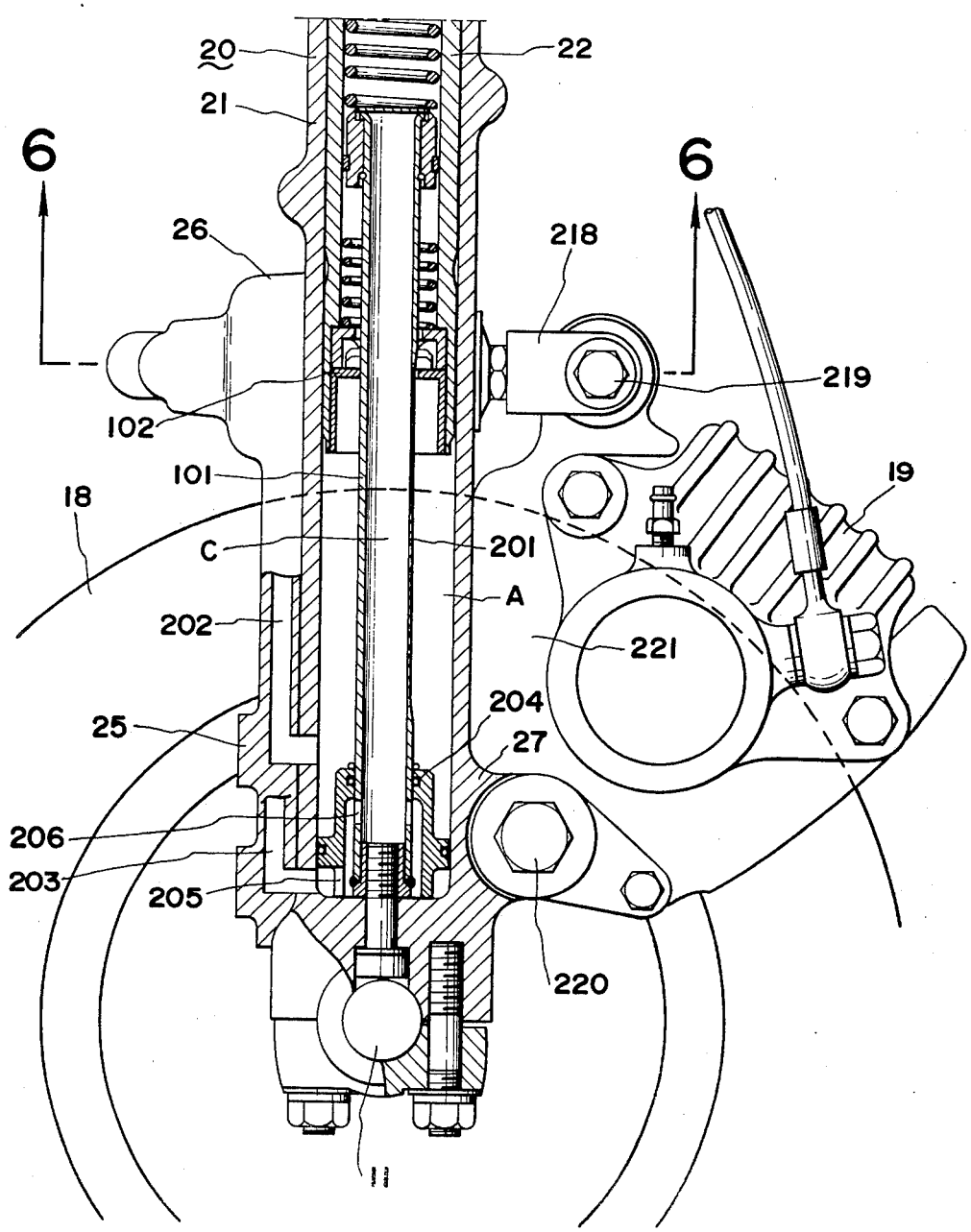
FIG. 5 is a view similar to FIG. 4 but showing still another preferred embodiment of the invention.
Figure 6:
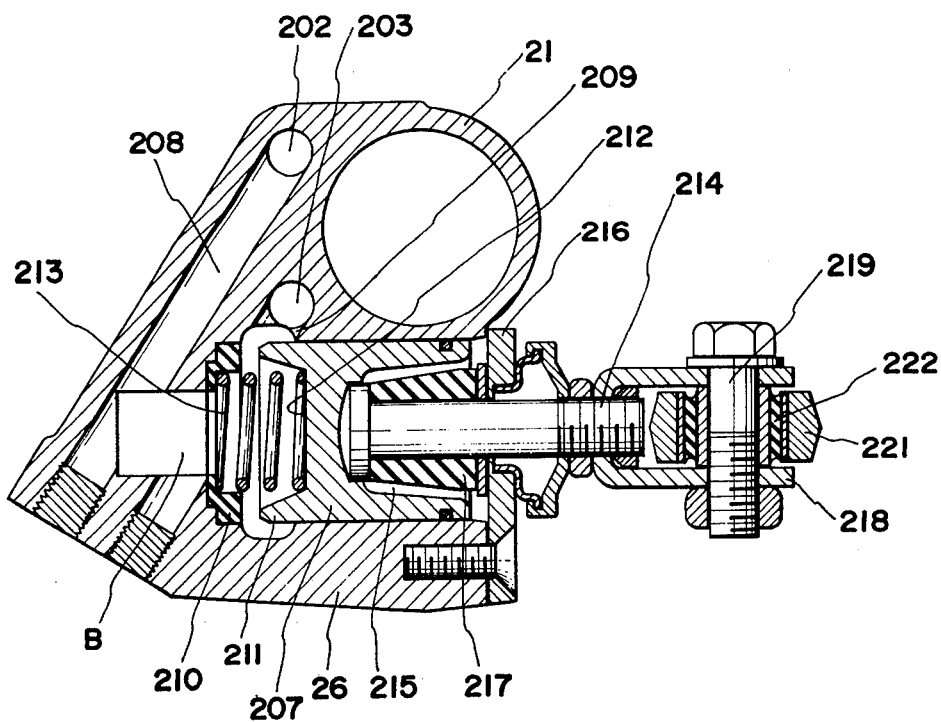
FIG. 6 is an enlarged sectional view taken along the plane of line 6—6 in FIG. 5.

FIGS. 5 and 6 illustrate still another embodiment of the invention, which differs from the FIG. 4 embodiment in that the motorcycle incorporates a disc brake of the so-called caliper type, instead of the internal-expanding brake, on the front wheel. These drawings also show only one of the prongs of the front fork, the other prong being of identical construction.

The illustrated front fork prong comprises the telescoping bottom case 21 and fork pipe 22, and the inner tube 101 arranged coaxially within the bottom tube. The usual helical compression spring is shown to be installed between the fork pipe 22 and inner tube 101. The fork pipe 22 terminates at its lower end in the piston 102 which is slidably but pressure-tightly fitted over the inner tube 101. The inner tube may be formed with a groove-like recess 201 extending longitudinally a suitable distance on its external surface.

The outer bottom case 21 has a ridge 25 formed lengthwise on its external surface, and this ridge terminates at its top end in a valve housing 26 which can be integral with the bottom case. Extending longitudinally through the ridge 25 are a passageway 202 in open communication with the first hydraulic fluid chamber A between the outer and inner bottom cases 21 and 101, and another passageway 203 in open communication with the second fluid chamber C within the inner bottom tube. The passageway 203 communicates with the second fluid chamber C via an aperture 205 in a support 204 supporting the lower end of the inner bottom tube 101 and an aperture 206 in the inner bottom tube. The first and second fluid chambers A and c are discommunicated from each other at the lower end of the front fork.

With reference to FIG. 6 the valve housing 26 accommodates a normally open, spring-returned shutoff valve including a piston-like valve member 207 arranged for back-and-forth sliding motion relative to the valve housing in a direction at right angles with the axis of the bottom case 21. The aforesaid passageway 202 communicates via a passageway 208 with the valve chamber B accommodating the valve member 207, whereas the passageway 203 communicates with the valve chamber via a passageway 209. Thus, with the reciprocating motion of the piston 102 at the lower end of the fork pipe 22 within the outer bottom case 21, the fluid will flow through the hydraulic circuit comprising the first fluid chamber A, passageways 202 and 208, valve chamber B, passageways 209 and 203, and second fluid chamber C.

Within the valve housing 26 a valve seat is arranged at 210 in opposed relationship to the left-hand end, as seen in FIG. 6, of the valve member 207. The valve seat 210 may be made of resilient material so that it may lessen the shock caused upon contact with the valve member 207. This valve member has its left-hand end bored centrally at 212 to provide an annular contact face 211 with the valve seat 210, and a helical compression spring 213 extends between the bored end of the valve member 207 and a step formed on the inside of the valve seat 210. The valve member 207 is thus biased to, and normally held in, the position of FIG. 6 to intercommunicate the first and second fluid chambers A and C via the valve chamber B.

The valve member 207 has a stem 214 extending outwardly through an end plate 216 screwed or otherwise attached to the open end of the valve housing 26. A recess 215 formed in the right-hand end of the valve member 207 accommodates a pad 217 to reduce the shock that will occur upon return of the valve member to its illustrated normal position.

The projecting end of the valve stem 214 is coupled to a caliper holder 221, which functions as the braking detector member, via a knuckle joint 218 including a pin 219. The caliper holder 221 is pivotally supported by a pin 220 mounted on a lug 27 integral with the outer bottom case 21 of the front fork. The caliper 19, supported by the holder 221, operates in the well known manner to grip pincer-wise the usual brake disc 18 arranged coaxially with the front wheel of the motorcycle for simultaneous rotation therewith. A pad 222 is interposed between the knuckle pin 219 and caliper holder 221.

It will be noted from FIG. 5 that the pivot pin 220 supporting the caliper holder 221 is arranged out of axial alignment with the front wheel axle 11. This arrangement is essential to keep the span of the front fork 20 to a minimum. In the preceding embodiment of the invention incorporating the internal-expanding brake, the brake panel 14, which is substantially equivalent in function to the caliper holder 222 as far as this invention is concerned, is disposed coaxially with the front wheel axle without any increase in the span of the front fork. In this third embodiment, however, which is directed to the partial disc brake, the pivotal mounting of the caliper holder on the front wheel axle would result in substantial increase in the front fork span.

In operation, the caliper 19 grips the rotating brake disc 18 when the front wheel is braked, with the result that the caliper with its holder 221 undergoes some angular displacement about the pivot pin 220 in the counterclockwise direction as viewed in FIG. 5. The valve member 207 is thus caused to travel to the left, as viewed in FIG. 6, via the knuckle joint 218 and valve stem 214 against the bias of the compression spring 213 and against the pressure of the hydraulic fluid from the first fluid chamber A. As the annular contact face 211 of the valve member moves into contact with the valve seat 210, the first fluid chamber A becomes disconnected from the second fluid chamber C. The fork pipes 22 of the front fork are thus restrained from unnecessary depression into the outer bottom cases 21.

If some impulsive upward thrust or jolt is exerted on the bottom cases 21 of the front fork when the motorcycle is braked as above, then the first and second fluid chambers A and C will intercommunicate through the valve chamber B as the valve is compulsorily opened by the increased pressure of the hydraulic fluid from the first chamber. The front fork will then undergo compression to lessen the shock, as will be apparent from the foregoing description of the FIG. 4 embodiment.

Figure 7:
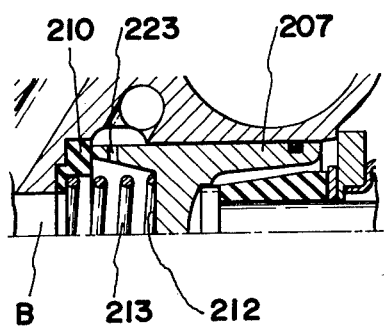
FIG. 7 is a view similar to FIG. 6 but showing a slight modification of the embodiment shown in FIGS. 5 and 6.

FIG. 7 illustrates a slight modification of the preceding embodiment of FIGS. 5 and 6, in which a leak hole 223 is formed through the valve member 207 to permit some leakage of the hydraulic fluid from the first chamber A to the second chamber C while the valve member is in the closed position as in the drawing. In this manner the front fork will make some slight compression upon braking, rather than being held fully extended. It may be worth mentioning, however, that similar fluid leakage also takes place in the valve mechanism of FIG. 6, though to a much lesser extent.

While the various objects of this invention, either expressly stated or otherwise, are believed to have been fully accomplished in the preferred forms of the motorcycle front-wheel suspension shown and described hereinbefore, it is also understood that the invention itself is not to be restricted by the exact showing of the drawings or the description thereof, as many modifications will readily occur to those skilled in the art on the basis of this disclosure. It is therefore appropriate that the invention be construed broadly and in a manner consistent with the spirit and scope of the following claims.

What is claimed is:

1. In a front-end suspension for a motorcycle which includes a front fork having a pair of telescopic shock absorbers, and a brake on a front wheel, the combination thereof with:
   braking detector means for detecting the application of said brake on said front wheel;
   said braking detector means including a braking detector member which is arranged for angular displacement relative to said front fork upon application of said brake; and
   locking means actuated by said braking detector member for locking said telescopic shock absorbers in substantially fixed telescopic state;
   whereby said front fork is telescopically fixed when said brake is applied.

2. The combination of claim 1, wherein each of said telescopic shock absorbers includes a fork pipe and a bottom case, and wherein said locking means comprises:
   a lever pivotally supported at a point intermediate both ends thereof on said bottom case of one of said telescopic shock absorbers;
   a first link operatively connecting one end of said lever to said braking detector member; and
   a second link operatively connecting the other end of said lever to said fork pipes of said telescopic shock absorbers.

3. The combination of claim 2, wherein said brake on said front wheel is of the type having internal-expanding shoes, and wherein said braking detector member is a brake panel supporting said internal-expanding shoes, said brake panel being arranged in coaxial relationship to said front wheel so as to be rotatable independently of the same.

4. The combination of claim 2, wherein said locking means is arranged between said front wheel and said one telescopic shock absorber.

5. The combination of claim 1, wherein each of said telescopic shock absorbers contains a hydraulic fluid flowing through a predetermined path to permit the same to perform the shock-absorbing function, and wherein said locking means includes valve means adapted to shut off the flow of the hydraulic fluid through said path upon application of said brake on said front wheel.

6. The combination of claim 5, wherein each of said telescopic shock absorbers includes a fork pipe and a bottom case, said bottom case having its interior partitioned into first and second hydraulic fluid chambers such that the hydraulic fluid is forced to flow from said first to said second chamber through the predetermined path upon compression of the telescopic shock absorbers, and wherein said valve means comprises:
   a valve member movable between first and second positions, said valve member intercommunicating said first and second chambers of one of said telescopic shock absorbers in said first position and disconnecting said first and second chambers in said second position; and
   means for biasing said valve member to said first position whereby said first and second chambers are normally held intercommunicated.

7. The combination of claim 6, wherein said valve member has a check valve adapted to permit the flow of the hydraulic fluid from said second to said first chamber when said valve member is in said second position.

8. The combination of claim 6, wherein said valve means further includes a valve housing which is arranged on said bottom case of said one telescopic shock absorber and which defines therein a valve chamber communicating with said first and second chambers of said one telescopic shock absorber, said valve member being accommodated in said valve chamber.

9. The combination of claim 8, wherein said locking means further comprises:
   a stem secured at one end to said valve member and slidably extending through said valve housing to have the other end projecting outwardly therefrom;
   a lever pivotally supported at a point intermediate both ends thereof on said bottom case of said one telescopic shock absorber;
   a first link operatively connecting one end of said lever to said braking detector member; and
   a second link operatively connecting the other end of said lever to said other end of said stem.

10. The combination of claim 9, wherein said brake on said front wheel is of the type internal-expanding shoes, and wherein said braking detector member is a brake panel supporting said internal-expanding shoes, said brake panel being arranged in coaxial relationship to said front wheel so as to be rotatable independently of the same.

11. The combination of claim 8, wherein said brake on said front wheel is of the type having a brake disc and a caliper for gripping engagement of said brake disc, wherein said valve means further includes a stem secured at one end to said valve member and slidably extending through said valve housing to have the other end projecting outwardly therefrom, and wherein said braking detector member is a caliper holder holding said caliper thereon, said caliper holder being pivotally mounted on said bottom case of said one telescopic shock absorber and coupled at its free end to said other end of said stem.

12. The combination of claim 11, wherein said caliper holder is mounted on said bottom case via a pivot pin which is arranged out of axial alignment with an axle of said front wheel so as not to necessitate an increase in the span of said front fork.

13. The combination of claim 6, wherein said valve member has a leak hole therethrough which communicates said first chamber with said second chamber when said valve member is in said second position.

* * * * *